(12) United States Patent
Miller et al.

(10) Patent No.: US 10,719,553 B2
(45) Date of Patent: Jul. 21, 2020

(54) SYSTEMS AND METHODS FOR FILTERING OF MEDIA DATA BASED ON TO-DO LIST

(71) Applicant: Rovi Guides, Inc., San Carlos, CA (US)

(72) Inventors: Ashleigh Miller, Denver, CO (US); Mario Sanchez, San Jose, CA (US); Phillip Teich, Pasadena, CA (US); Carla Mack, Los Angeles, CA (US)

(73) Assignee: Rovi Guides, Inc., San Jose, CA (US)

( * ) Notice: Subject to any disclaimer, the term of this patent is extended or adjusted under 35 U.S.C. 154(b) by 1088 days.

(21) Appl. No.: 15/079,892

(22) Filed: Mar. 24, 2016

(65) Prior Publication Data
US 2017/0277699 A1   Sep. 28, 2017

(51) Int. Cl.
| | | |
|---|---|---|
| G06F 16/00 | (2019.01) | |
| G06F 16/78 | (2019.01) | |
| G06F 16/738 | (2019.01) | |
| G06Q 10/06 | (2012.01) | |
| H04N 21/25 | (2011.01) | |
| H04N 21/472 | (2011.01) | |
| H04N 21/258 | (2011.01) | |
| H04N 21/482 | (2011.01) | |
| G06F 3/0484 | (2013.01) | |

(52) U.S. Cl.
CPC ...... *G06F 16/7867* (2019.01); *G06F 3/04847* (2013.01); *G06F 16/738* (2019.01); *G06Q 10/0631* (2013.01); *H04N 21/251* (2013.01); *H04N 21/25883* (2013.01); *H04N 21/472* (2013.01); *H04N 21/4821* (2013.01)

(58) Field of Classification Search
CPC ............... G06F 16/7867; G06F 16/738; G06F 3/04847; G06Q 10/0631; H04N 21/251; H04N 21/25883; H04N 21/472; H04N 21/4821

USPC ............................................... 707/722
See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 7,165,098 B1 | 1/2007 | Boyer et al. |

(Continued)

FOREIGN PATENT DOCUMENTS

WO   WO-2015195320   12/2015

OTHER PUBLICATIONS

U.S. Appl. No. 14/998,109, filed Dec. 23, 2015, Lin.

*Primary Examiner* — Monica M Pyo
(74) *Attorney, Agent, or Firm* — Haley Guiliano LLP

(57) ABSTRACT

Systems and methods are disclosed herein for resolving a meaning of an ambiguous calendar entry and recommending broadcast media based on the meaning. To this end, a media guidance application may detect a calendar entry specific to a user, and determine that the calendar entry is ambiguous with respect to an associated period of time. In response to determining that the calendar entry is ambiguous with respect to the associated period of time, the media guidance application may determine characteristics of the calendar entry and the user, and compute an estimated range of time corresponding to the calendar entry based on the characteristic of the calendar entry and the characteristic of the user. The media guidance application may then generate for display a recommendation of broadcast media based on the estimated range of time.

17 Claims, 5 Drawing Sheets

(56) References Cited

U.S. PATENT DOCUMENTS

| | | |
|---|---|---|
| 7,761,892 B2 | 7/2010 | Ellis et al. |
| 8,046,801 B2 | 10/2011 | Ellis et al. |
| 2002/0174430 A1 | 11/2002 | Ellis et al. |
| 2005/0251827 A1 | 11/2005 | Ellis et al. |
| 2006/0212900 A1* | 9/2006 | Ismail .................... H04H 60/06 725/34 |
| 2006/0287915 A1* | 12/2006 | Boulet ................... G06Q 30/02 705/14.61 |
| 2007/0288950 A1* | 12/2007 | Downey ............. H04H 20/103 725/9 |
| 2008/0250334 A1* | 10/2008 | Price .................... G06Q 10/109 715/753 |
| 2009/0049051 A1* | 2/2009 | Horowitz ............ G06F 16/4387 |
| 2009/0160859 A1* | 6/2009 | Horowitz ............ G06T 11/206 345/440 |
| 2010/0153885 A1 | 6/2010 | Yates |
| 2014/0072277 A1* | 3/2014 | Takao .................. G06Q 10/109 386/239 |
| 2015/0058873 A1 | 2/2015 | Newell et al. |
| 2016/0029085 A1 | 1/2016 | Mountain |

\* cited by examiner

SYSTEMS AND METHODS FOR FILTERING OF MEDIA DATA BASED ON TO-DO LIST

BACKGROUND

Integration of functionality of devices that were traditionally stand-alone devices is becoming commonplace. As an example, tablets and smartphones now combine functionality of telephonic communications, calendars, e-mail, and much more. One challenge with integrating cross-device functionality is leveraging capabilities of a traditional device so that it enhances the capabilities of another traditional device. Leveraging information from a user's personal calendar when providing program recommendations has not been fully developed.

SUMMARY

Systems and methods are provided herein for deciphering the meaning of an ambiguous calendar and providing recommendations (e.g., for broadcast media) based on the new understanding of the calendar information. As an example, not all information on a user's personal calendar is ascribed to a particular time range. While a doctor's appointment may be pre-planned to occur from 4-5 pm, for example, a calendar entry for one to do his or her homework may be ambiguous as to a particular range of times for the homework to be done. Thus, systems and methods are provided herein for estimating a range of time that an ambiguous task would occur in, and providing media recommendations based on the estimation.

To this end, in some aspects, control circuitry of a user equipment may execute a media guidance application, which may detect a calendar entry specific to a user. The calendar entry may, for example, be an entry that a user added to his smartphone calendar, or to a cloud calendar, such as a Google calendar.

In some embodiments, the media guidance application may detect the calendar entry in relation to a user request to view media asset identifiers, such as broadcast listings, for a desired time period. To this end, the media guidance application may receive, from the user, a request to view media asset identifiers corresponding to a desired time period. This may be, for example, the user requesting broadcast listings for a present time period. In response to receiving the request, the media guidance application may query a database comprising a personal calendar of the user, wherein the personal calendar comprises the calendar entry.

In some embodiments, the media guidance application may query the personal calendar for an entry corresponding to the desired time period. For example, if the personal calendar is a data structure organized by time periods, the media guidance application may send an SQL query for information relating to the desired time period, such as a present time period. The media guidance application may then retrieve, based on the query, the calendar entry from the personal calendar, where the calendar entry partially corresponds to the desired time period. The calendar entry may partially correspond to the desired time period by, for example, being an entry that should be done during or near the desired time period, but will not take up the entire desired time period. An example of this is an entry indicating homework needs to be completed that evening, but where the entry does not indicate at what point in the evening the homework will be done.

In some embodiments, the media guidance application may determine that the calendar entry is ambiguous with respect to an associated period of time. As explained partially above, in order for the media guidance application to determine that the calendar entry is ambiguous with respect to the associated period of time, the media guidance application may determine that the calendar entry is a task that is to be performed by the user within the desired time period, but that the calendar entry is not specific with respect to at least one of (1) how much time of the desired time period the task will require, or (2) what portion of the desired time period the task will take place.

In some embodiments, in response to determining that the calendar entry is ambiguous, the media guidance application may determine a characteristic of the calendar entry and a characteristic of the user. The media guidance application may then compute an estimated range of time corresponding to the calendar entry based on the characteristic of the calendar entry and the characteristic of the user.

In some embodiments, in order to determine the characteristic of the calendar entry, the media guidance application may ascertain what task is called for by the calendar entry. For example, the media guidance application may analyze keywords within the calendar entry, such as the word "homework," and compare those keywords to entries of a database, to ascertain a task called for by the calendar entry. Similarly, in order to determine the characteristic of the user, the media guidance application may determine a trait indicated in a profile of the user that has a correlation to task, such as an age, an ability level, and the like.

In some embodiments, in order to compute the estimated range of time corresponding to the calendar entry based on the characteristic of the calendar entry and the characteristic of the user, the media guidance application may access a database. The media guidance application may then access an entry of the database corresponding to the task, such as an entry that indicates factors that affect how long homework might take. The media guidance application may then compare the trait to metadata of the entry to find metadata matching the trait, and, in response to finding metadata matching the trait, the media guidance application may compute the estimated range of time based on the metadata matching the trait. For example, if the trait indicates that the user is a third grader, and the metadata indicates that a third grader usually takes one hour to do homework on a given night, the media guidance application may compute a range of time that lasts one hour.

In some embodiments, the media guidance application may determine that the trait is at least one of an age and an ability of the user. The media guidance application may, when computing the estimated range of time, compute an estimated amount of time required for a person of at least the age or the ability to complete the task. For example, if the task is completing homework, but the user has a learning disability, the media guidance application may estimate a longer amount of time for completion of the homework than it would for someone without a learning disability.

In some embodiments, the media guidance application may access user-specific data correlating to an estimated range of time the user may take to complete the ambiguous calendar entry. For example, the system may determine a similar homework task required 45 minutes to complete for this user in the previous instance of the similar calendar entry. The system furthermore may use any combination of data and factors in determining the estimated time, including user activity not associated with completing the task, or when the user stopped working on the task and consumed media in the previous instance of the ambiguous task on the calendar.

In some embodiments, the media guidance application may generate for display a recommendation of media based on the estimated range of time. For example, the media guidance application may recommend media that is broadcast at times that allow for the user to perform a task. As another example, the media guidance application may recommend non-broadcast, unscheduled media that has a duration that fits around the estimated range of time. In some embodiments, the media guidance application may generate for display media asset identifiers corresponding to media that will not be broadcast during the estimated range of time. In some embodiments, the media guidance application may generate for display a justification of the estimated range of time that explains why the recommendation was made. In some embodiments, the media guidance application may generate for display a selectable option for the user to adjust the estimated range of time. The media guidance may receive user input to adjust the estimated range of time, and may, in response to receiving the user input, generate for display a modified recommendation of broadcast media. For example, the media guidance application may detect that a user wishes to do his homework at a different time period than expected, and may accordingly adjust the recommendations.

In some embodiments, the media guidance application may receive proof from the user that the user has completed a task called for by the calendar entry prior to an expiration of the range of time, and, in response to receiving the proof, the media guidance application may modify the recommendation to include media asset identifiers for media that are consumable during the estimated range of time. For example, if a user proves that he has finished his homework ahead of schedule, the user may receive recommendations for media that would have interfered with the original estimated time for the user to do his homework.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
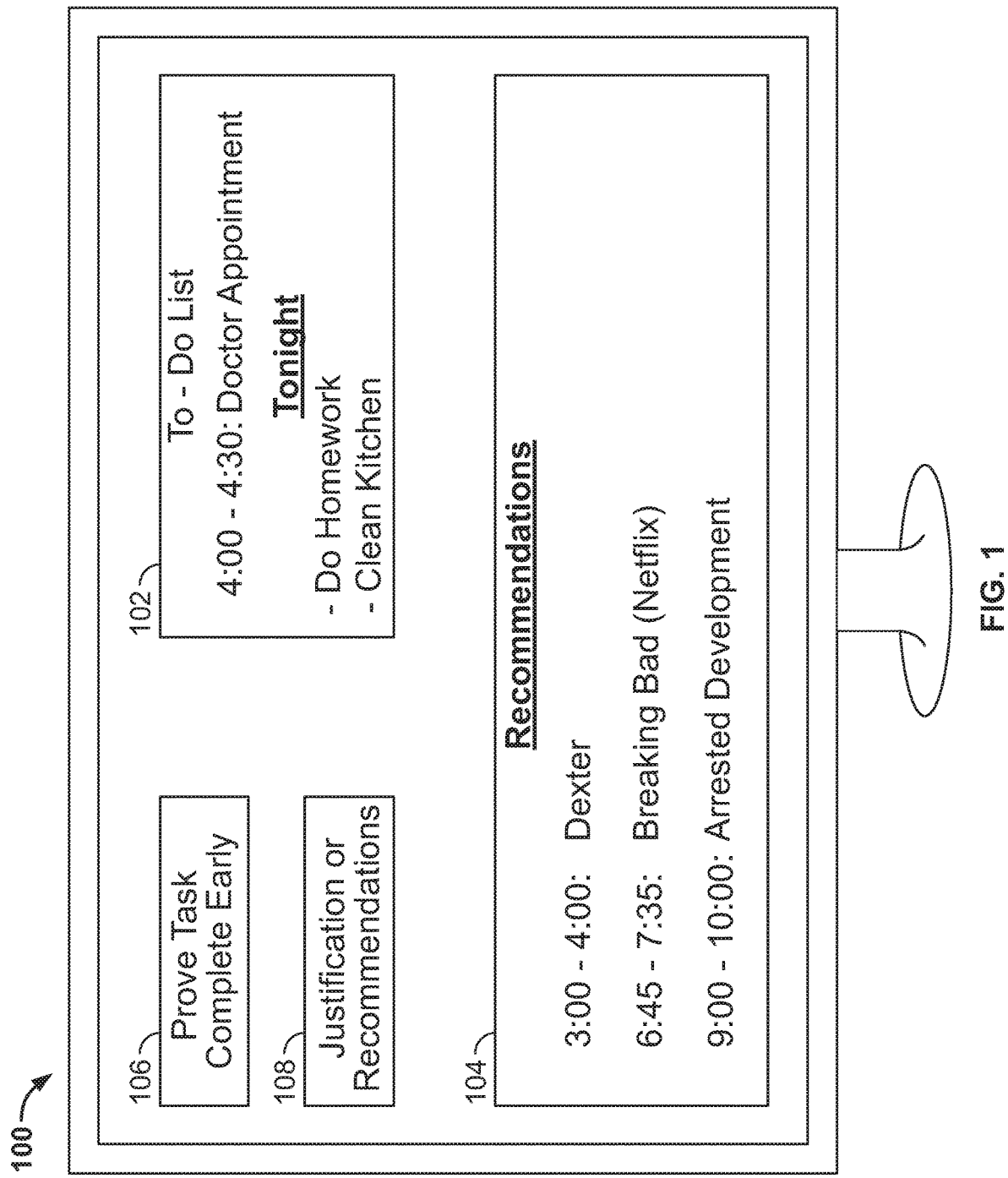
FIG. 1 depicts user equipment that may recommend media listings based on entries of a to-do list, in accordance with some embodiments of the disclosure.

FIG. 1 depicts user equipment that may recommend media listings based on entries of a to-do list, in accordance with some embodiments of the disclosure. FIG. 1 includes user equipment 100. The functionality of various user equipment is discussed below with respect to FIGS. 2-5; user equipment 100 may be equipped with any of or all of this functionality.

To-do list 102 may be generated for display by user equipment 100. Alternatively, to-do list 102 may be generated for display by a different user equipment. The contents of to-do list 102 may be stored on memory local to or within user equipment 100, or may be stored on a database remote to user equipment 100, such as on a database accessible by way of a communications network. Local memory, remote databases, and communications networks are discussed below with respect to FIGS. 2-5, and the functionality discussed below applies to storage of the contents of to-do list 102. Mechanisms of display are also described below with respect to FIGS. 2-5, and these mechanisms apply to a display of to-do list 102, recommendations 104, option 106, justification 108, and any other graphical user interface or image described herein. While to-do list 102 is depicted as displayed in FIG. 1, the display of to-do list 102 is optional. Option 106, justification 108, and recommendations 104 are also optionally displayed.

The contents of to-do list 102 may be populated manually. For example, a user may enter a task into to-do list 102, and may associate it with a time, date, location, or any other factor. To-do list 102 may, alternatively, be automatically populated by a media guidance application operating by way of control circuitry implemented in user equipment 100. Control circuitry and the functionality of the media guidance application are discussed further below with respect to FIGS. 2-5, and that functionality applies hereto. The media guidance application may populate the to-do list by learning of tasks through any mechanism (e.g., by parsing e-mail, social chatter, and other textual communications; by monitoring voice communications; by monitoring activity by a user of user equipment 100 on any application associated with the user; by monitoring activity of friends; and any other known mechanisms of learning of, or estimating, when a task should be added to a to-do list).

Recommendations 104 may be populated based on the contents of to-do list 102. The media guidance application may cause recommendations 104 to include media asset identifiers corresponding to broadcast assets, where the broadcast times of the broadcast assets do not conflict with the to-do list. The media guidance application may populate recommendations 104 with media asset identifiers corresponding to on-demand assets available from either traditional on-demand providers, or streaming providers, where the duration of the recommended on-demand assets fits between a time associated with various tasks. This, and other facets of recommendations 104, are described in further detail below. When the media guidance application receives a selection of option 106, the media guidance application may enable a user to prove that a task was completed ahead of schedule. Upon receipt of such proof, the media guidance application may expand recommendations 104 to include additional recommendations. This functionality will be described in further detail below.

In some embodiments, control circuitry of user equipment 100 may execute a media guidance application, which may detect a calendar entry specific to a user. The calendar entry may be an entry of to-do list 102. The term "calendar entry" as used herein is defined to mean any indicia of a task or obligation of a user that is stored in a data structure associated with a user. The calendar entry may, for example, be an entry that a user added to his smartphone calendar, or to a cloud calendar, such as a Google calendar. The term task as used herein is used to refer to the actual obligation indicated within the "calendar entry." The term "calendar" as used herein is defined to mean any data structure associated with a user that indicates tasks or obligations of the user across a continuum of time including a to-do list not associated directly with a traditional calendar or time period. The terms "personal calendar" and "calendar" are used interchangeably, and carry equal weight and meaning.

In some embodiments, the media guidance application may detect a calendar entry in relation to a user request to view media asset identifiers, such as broadcast listings, for a desired time period. The media guidance application may receive a request from a user to view broadcast program listings for either a current time (e.g., when the user presses a "guide" button on a remote controller), or for a specified time. As another example, the media guidance application may receive a request from a user to view on-demand media (e.g., from an on-demand service of a traditional cable provider), or to view media asset identifiers for over-the-top ("OTT") or streaming media (e.g., from streaming applications such as HBO GO, Netflix, and Hulu). The term "desired time period" as used herein refers to either a specified time period (e.g., as input by a user), a default time period, a current time period, or a derived time period using other means described herein. In connection with unscheduled media, such as on-demand, streaming, and OTT media, the desired time period is what is available at a specified or current time.

In some embodiments, when detecting the calendar entry, the media guidance application may query the personal calendar for an entry corresponding to the desired time period. The media guidance application may then retrieve, based on the query, the calendar entry from the personal calendar, where the calendar entry partially corresponds to the desired time period. For example, if a user has a calendar entry to go to a doctor appointment between 4:00 and 4:30 in to-do list 102, then the query would retrieve this calendar entry. In some instances, the calendar entry may partially correspond to the desired time period by, for example, being an entry that should be done during or near the desired time period, but will not take up the entire desired time period. As an example, as depicted in FIG. 1, to-do list 102 indicates the tasks of homework and cleaning the kitchen as needing to be performed "tonight." The media guidance application may detect that the desired time period is in the evening, and thus that the tasks of homework and cleaning the kitchen correspond to that desired time period.

Moreover, in some embodiments, the media guidance application may determine that the calendar entry is ambiguous with respect to an associated period of time. For example, as described above, and as is depicted in to-do list 102, the entries for doing homework and cleaning the kitchen are indicated as needing to be done "tonight," but it is unclear how much time these tasks will take, or at what portion of the evening the tasks will take place. In response to determining that the calendar entry is ambiguous with respect to the associated period of time. In order for the media guidance application to determine that the calendar entry of to-do list 102 is ambiguous with respect to the associated period of time, the media guidance application may determine that the calendar entry is a task that is to be performed by the user within the desired time period, but that the calendar entry is not specific with respect to at least one of (1) how much time of the desired time period the task will require, or (2) what portion of the desired time period the task will take place. The media guidance application may make this determination by detecting a lack of a desired time period being indicated in to-do list 102.

In some embodiments, in response to determining that the calendar entry is ambiguous, the media guidance application may determine a characteristic of the calendar entry and a characteristic of the user. In order to determine the characteristic of the calendar entry, the media guidance application may ascertain what task is called for by the calendar entry. For example, the media guidance application may analyze keywords within the calendar entry, such as the word "homework," and compare those keywords to entries of a database, to ascertain a task called for by the calendar entry. The database may include entries relating to known tasks, such as cleaning, homework, driving, doctors appointments, and any other task. The media guidance application may perform its analysis by comparing keywords of the calendar entry to entries of the database for a match.

Similarly, in order to determine the characteristic of the user, the media guidance application may determine a trait indicated in a profile of the user that has a correlation to task. The term "trait," as used herein, is hereby defined to be any feature of or associated with the user that affects a user's ability to complete a task. For example, if a user owns a bicycle, but not a car, this will affect how long the user may take to go grocery shopping at a store one mile away. The ownership of the bicycle, and/or lack of ownership of the car, may be a trait. Other non-limiting examples include that a user is part of a particular classroom, the user has a disability or broken bone, the user's tools (such as a car) are presently under repair, a friend the user usually commutes or travels with is delayed (which may imply a user is delayed), and the like.

In some embodiments, in order to compute the estimated range of time corresponding to the calendar entry based on the characteristic of the calendar entry and the characteristic of the user, the media guidance application might seek to determine how long a typical user who has the trait takes to complete a similar task. To this end, the media guidance application may compare the trait to metadata of the entry corresponding to the task to find metadata matching the trait, and, in response to finding metadata matching the trait, the media guidance application may compute the estimated range of time based on the metadata matching the trait. For example, if the task is to do homework, and the trait indicates that the user is a third grader, and the metadata indicates that a third grader usually takes one hour to do homework on a given night, the media guidance application may compute a range of time that lasts one hour. The metadata used to estimate how much time a task will require may be of any scope. Following from the homework example, the metadata may be the average time this particular person takes to do his or her homework, or may be the average time the members of his third grade class take to do their homework, or an estimation of time that the homework will take from a teacher that is adjusted based on specific traits of the user. The media guidance application may make a determination of which metadata will yield a most accurate calculation. The media guidance application may use less robust sets of data to make predictions. For example, if a user's to-do list indicates a hair-cut is to be obtained, the media guidance application may calculate an estimated time for this task to occur based on how long one previous haircut took.

In some embodiments, the media guidance application may calculate the estimated range of time based on external data. For example, the estimated range of time may be dynamic, and adjusted based on predicted traffic delays by a GPS application while a user is traveling in connection with a task. The media guidance application may also use travel indicators such as GPS movement to calculate when a task is completed, for example estimating the time a haircut required based on the user leaving the business or arriving home. The media guidance application may also receive information from a separate application, such as a social media application, that indicates a user has been distracted while performing a task and doing something unrelated to the task, which will delay the completion of the task. The media guidance application may adjust recommendations 104 based on this data.

Another consideration of the media guidance application when computing recommendations 104 is at what time the user is likely to perform the task. For example, while the media guidance application may estimate that the user has one hour of homework to do, it may be unclear based on to-do list 102 what point of the evening the homework is to be done. The media guidance application may determine this based on traits of the user. For example, the user may routinely do his homework immediately upon returning home from school, and thus the media guidance application may estimate when the user will return from school (e.g., factoring in after-school activities, a text message to a friend stating they will get pizza on their way home, etc.) and base recommendations 104 based on that estimated arrival time plus the estimated time of performing the student's homework. The media guidance application may determine this based on traits of other users that affect the user as well. For example, if a user does not do his homework unless his mother is home, and the media guidance application learns based on the mother's to-do list 102 that the mother is to return home at 6:00 pm, the media guidance application may resolve that the user will begin his homework at 6:00 pm.

In some embodiments, the media guidance application may generate for display recommendations 104 based on the estimated range of time. For example, the media guidance application may recommend media that is broadcast at times that allow for the user to perform a task, such as within a window between a user doing his homework and cleaning the kitchen as displayed in to-do list 102. To this end, in some embodiments, the media guidance application may generate for display media asset identifiers corresponding to media that will not be broadcast during the estimated range of time.

In some embodiments, recommendations 104 may include unscheduled, non-broadcast media, such as OTT content, content from streaming applications, on-demand media, and the like. The media guidance application may add such unscheduled media to recommendations 104 based on how long a user has between two tasks, and how long the runtime of the unscheduled media is. For example, broadcast programming tends to air either on the hour (e.g., 1:00 pm-2:00 pm) or on the half-hour (e.g., 1:30 pm-2:00 pm). If the media guidance application estimates a user to be free at times that would cause him to miss the beginning or end of broadcast media (e.g., from 1:43 pm-2:08 pm), the media guidance application may recommend unscheduled media that is 25 minutes long or less, so that the user can fully consume the unscheduled media before attending to the user's next task.

In some embodiments, the media guidance application may initiate a program buffer based on configuration that allows a user to complete a task that may overlap the start time of specific media.

In some embodiments, the media guidance application may generate for display a justification (e.g., justification 108) of the estimated range of time that explains why the recommendation was made. The media guidance application may cause justification 108 to note conflicts formed between scheduled media asset start times and entries of to-do list 102. The media guidance application may also cause justification 108 to, for example, explain that recommendations 104 will not include media for certain times that conflict with a scheduled task until the task is proven to be complete.

In some embodiments, the media guidance application may generate for display a selectable option for the user to adjust the estimated range of time. The media guidance may receive user input to adjust the estimated range of time, and may, in response to receiving the user input, generate for display a modified recommendation of broadcast media. For example, the media guidance application may detect that a user wishes to do his homework at a different time period than expected, and may accordingly adjust the recommendations. The media guidance application may require access credentials, such as login information of a parent, to enable the selectable option to adjust the estimated range of time.

In some embodiments, the media guidance application may receive proof from the user that the user has completed a task called for by the calendar entry prior to an expiration of the range of time, and, in response to receiving the proof, the media guidance application may modify the recommendation to include media asset identifiers for media that will be broadcast during the estimated range of time. For example, the media guidance application may generate for display option 106. Option 106 may be selected by a user to open a user interface for inputting proof that a task is complete. As an example, if a user proves that he has finished his homework ahead of schedule (e.g., by providing a photograph of a completed worksheet, or by electronically submitting a final product), the user may receive recommendations for media that would have interfered with the original estimated time for the user to do his homework. The media guidance application may require that access to option 106 requires someone with access credentials to approve that a task has in fact been complete. For example, it may be required that a parent or teacher affirm that homework is complete.

In some embodiments, the media guidance application may trigger an alarm to inform a user when a task is indicated by to-do list 102, and that if a user continues consuming media, the user will be late for a task of to-do list 102. In some embodiments, the media guidance application may automatically trigger the alarm as a task approaches a predetermined interval before the indicated time on to-do list 102. In some embodiments, the media guidance application may trigger the alarm based on a reminder set by a user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
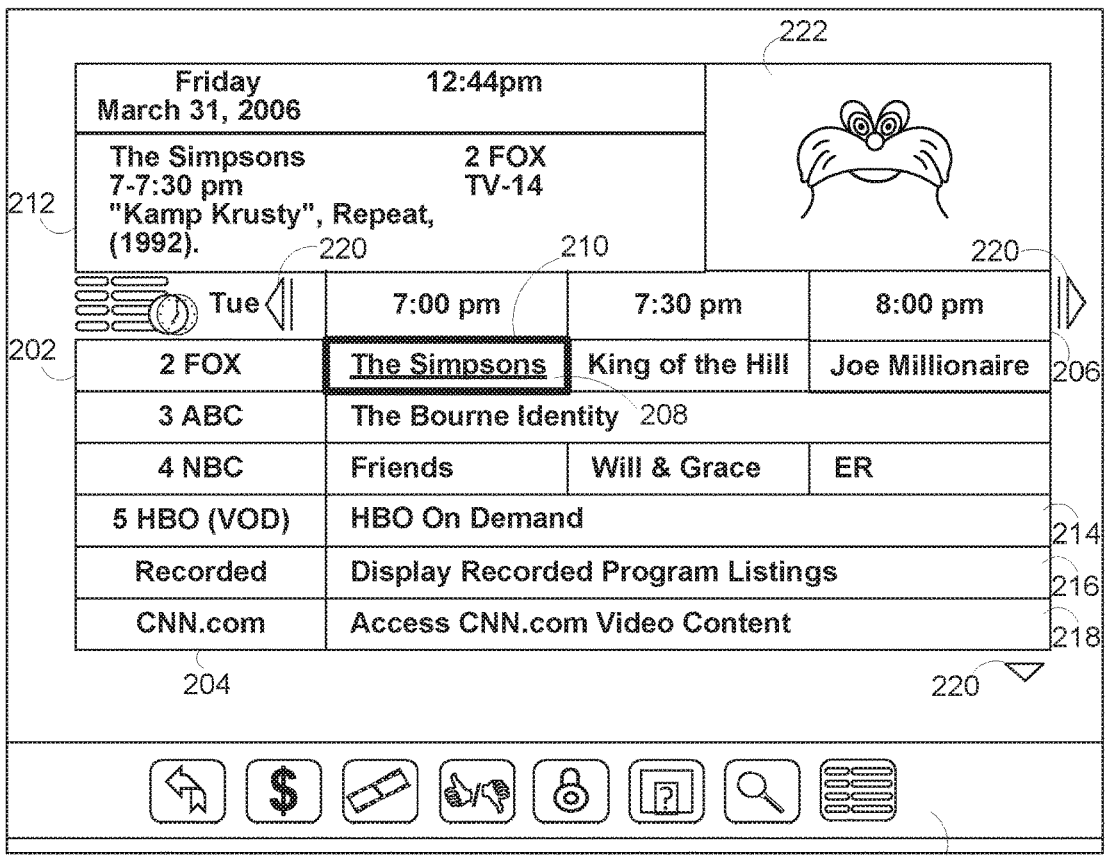
FIG. 2 shows an illustrative embodiment of a display screen that may be used to provide media guidance application listings and other media guidance information, in accordance with some embodiments of the disclosure.
Figure 3:
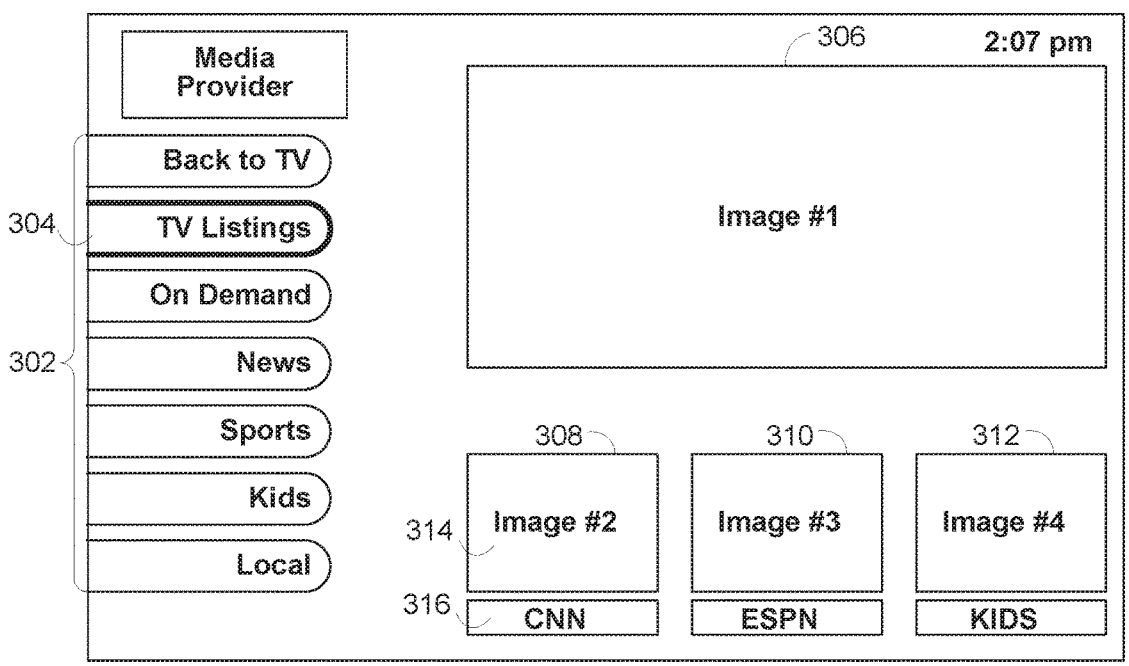
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
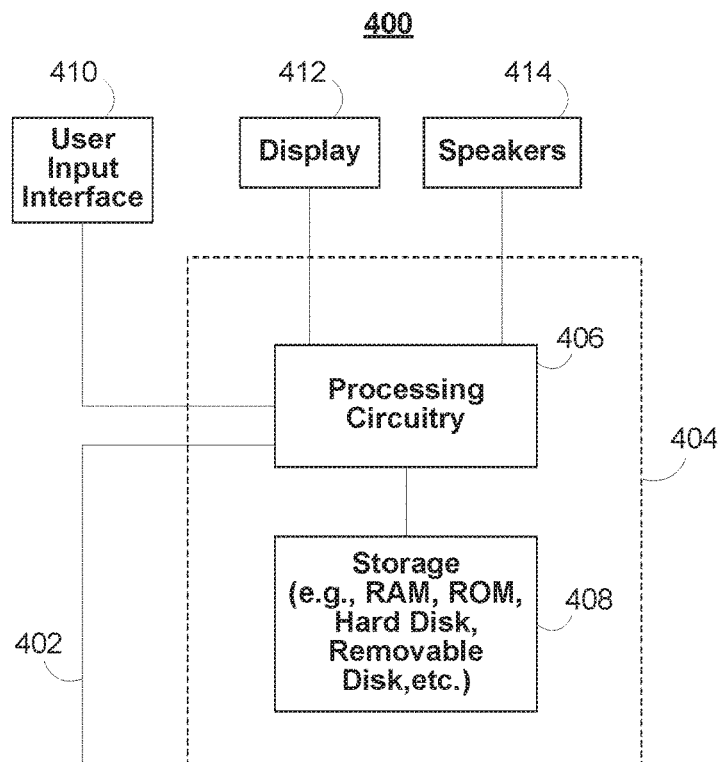
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
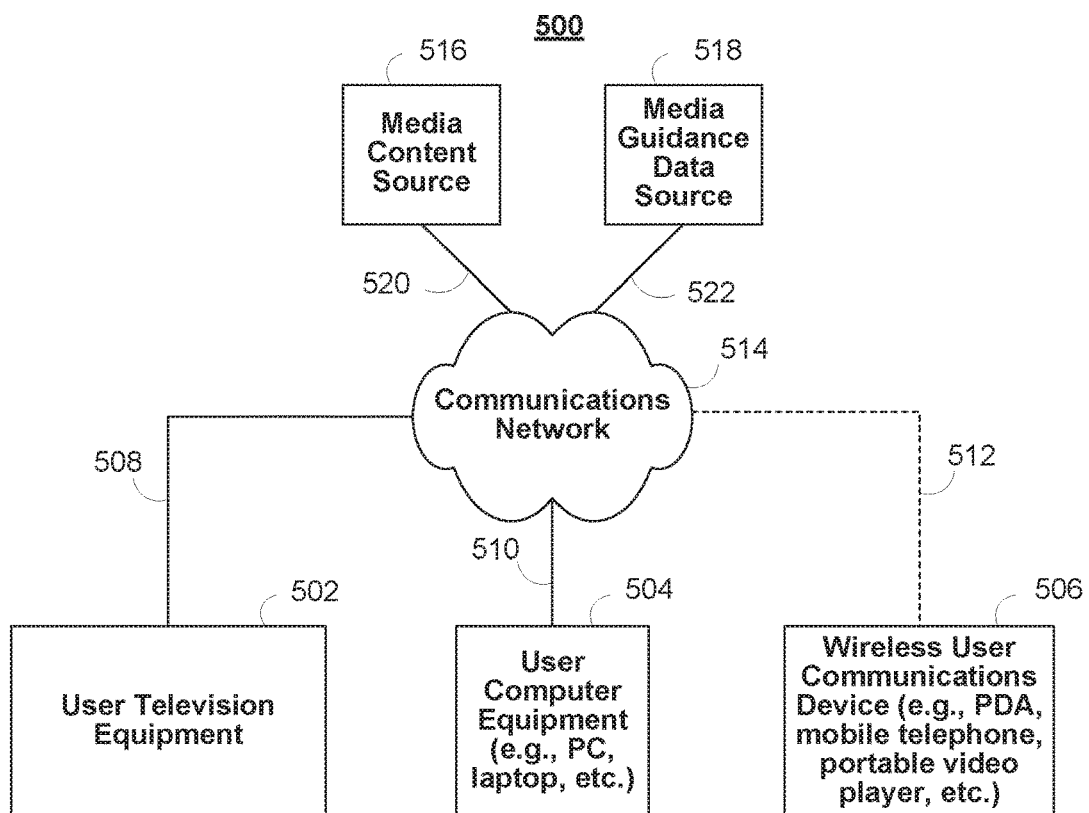
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
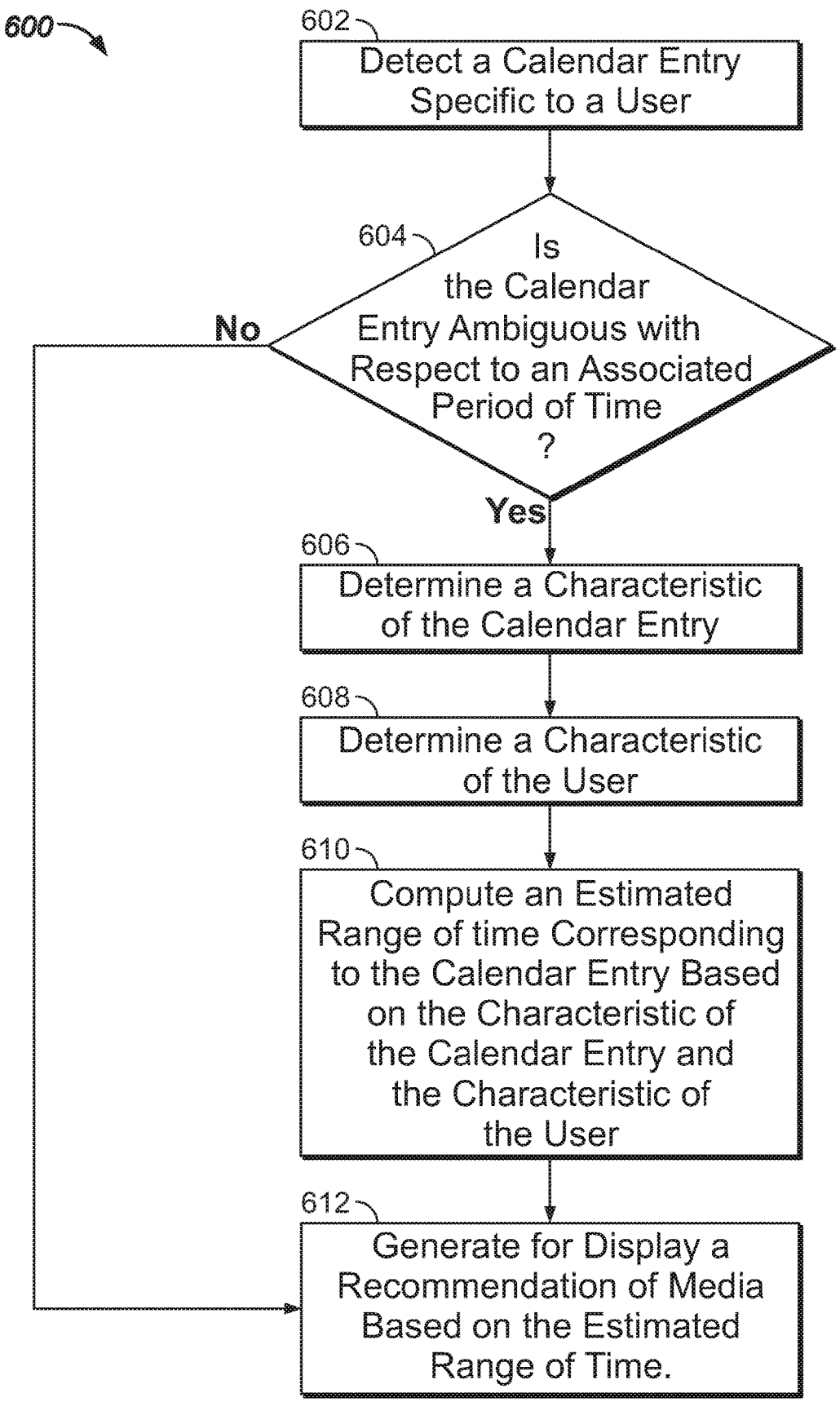
FIG. 6 is a flowchart of illustrative steps involved in providing recommendations of media based on a range of time that a user is expected to be busy, as derived from an ambiguous calendar listing, in accordance with some embodiments of the disclosure.

FIG. 6 is a flowchart of illustrative steps involved in providing recommendations of media based on a range of time that a user is expected to be busy, as derived from an ambiguous calendar listing, in accordance with some embodiments of the disclosure. Process 600 begins at 602, where a media guidance application executed by control circuitry 404 of user equipment 100 may detect a calendar entry specific to a user. User equipment 100 may have the same capabilities described with respect to any or all of user television equipment 502, user computer equipment 504, and wireless user communications device 506. The calendar entry may be stored local to user equipment 100 (e.g., at storage 408), or remote to user equipment 100 (e.g., at media guidance data source 518, accessible by way of communications network 514. The media guidance application may detect the calendar entry when a user attempts to access media asset identifiers, or based on any other manner described above.

Process 600 may continue to 604, where the media guidance application may determine whether the calendar entry is ambiguous with respect to an associated period of time. For example, a calendar entry of to-do list 102 may indicate that a task is to be performed in the evening, but may not indicate at what point in the evening the task is to be performed, or may not indicate how long the task will take to be performed. Mechanisms for the media guidance application to determine whether the calendar entry is ambiguous are described above and apply here with full force and effect. If the media guidance application determines that the calendar entry is not ambiguous, process 600 will continue to 612. If the media guidance application determines that the calendar entry is ambiguous, process 600 will continue to 606.

At 606, the media guidance application may determine a characteristic of the calendar entry. This may involve determining a task called for by the calendar entry. Manners of performing this are discussed above and apply here in equal force and effect.

At 608, the media guidance application may determine a characteristic of the user. As described above, the characteristic may be a trait of the user that may affect the length of time, or the range of times, when the task may be performed. The characteristic may be retrieved by control circuitry 404 from a data structure corresponding to a user profile, which may be stored at media guidance data source 518. The manners in which the media guidance application may determine the characteristic are described in greater detail above and have the same force and effect in the context of process 600.

At 610, the media guidance application may compute an estimated range of time corresponding to the calendar entry based on the characteristic of the calendar entry and the characteristic of the user. For example, as described above, the media guidance application may estimate when the user will perform the task based on any number of factors, such as an average time that is usually taken to perform the task, personal traits that would cause that average time to fluctuate, and the like. These factors were described above and that discussion has full force and effect in the context of process 600.

At 612, the media guidance application may generate for display a recommendation (e.g., recommendation 104) of media based on the estimated range of time. For example, if a to-do list indicates that the user is unavailable from 4:00 -4:30, and the media guidance application estimates that homework will be performed from 4:00 -6:45, and the kitchen will be cleaned between 7:35 and 9:00, the media guidance application may generate for display recommendations 104 as depicted in FIG. 1, which recommends media at times do not conflict with these obligations of the user.

Figure 7:
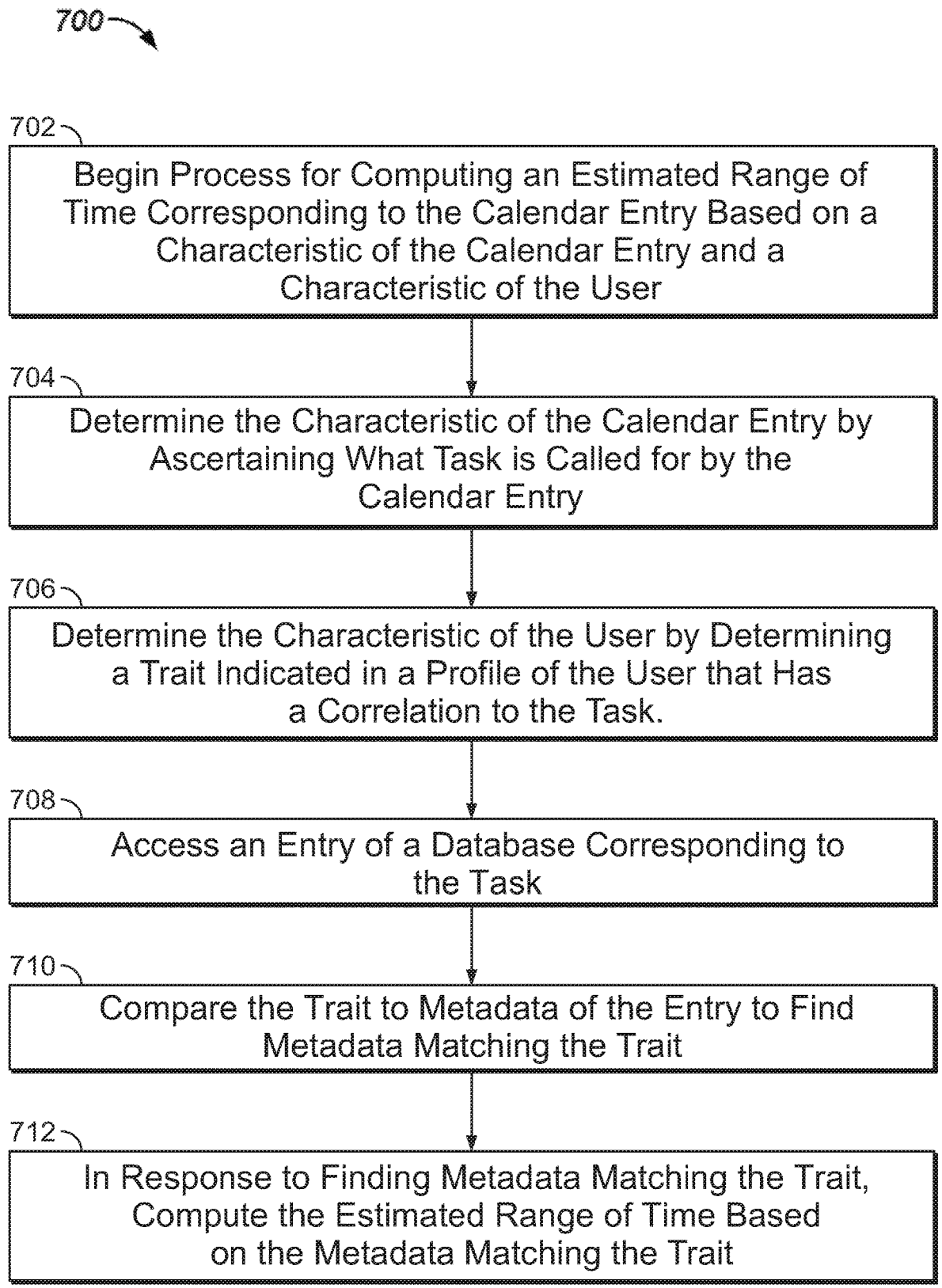
FIG. 7 is a flowchart of illustrative steps involved in computing an estimated range of time that a user is expected to be busy, in accordance with some embodiments of the disclosure.

FIG. 7 is a flowchart of illustrative steps involved in computing an estimated range of time that a user is expected to be busy, in accordance with some embodiments of the disclosure. Process 600 begins at 602, where a media guidance application executed by control circuitry 404 of user equipment 100 begins a process for computing an estimated range of time corresponding to the calendar entry based on a characteristic of the calendar entry and a characteristic of the user. Process 700 continues to 704, where the media guidance application may determine the characteristic of the calendar entry by ascertaining what task is called for by the calendar entry. As described in the foregoing, the media guidance application may ascertain the task by comparing keywords of the calendar entry to entries of a database that corresponds to tasks. The media guidance application may ascertain the task through any manner described above.

Process 700 continues to 706, where the media guidance application may determine the characteristic of the user by determining a trait indicated in a profile of the user that has a correlation to the task. The media guidance application may determine the trait through any manner described above and below (e.g., by consulting a profile corresponding to the user).

Process 700 continues to 708, where the media guidance application may access an entry of a database corresponding to the task, and then to 710, where the media guidance application may compare the trait to metadata of the entry to find metadata matching the trait. As described above, the media guidance application may determine that the metadata indicates the user des not own a car, and that the metadata indicates that without a car, the task will take three times as long. Details of the entries corresponding to the task, and of the traits, and of the metadata were described at greater length above, and those discussions are within the scope of process 700.

Process 700 may continue to 712, where, in response to finding metadata matching the trait, the media guidance application may compute the estimated range of time based on the metadata matching the trait. For example, the media guidance application may compute that a task of getting a haircut normally takes one hour, but will take two hours in this instance because the user does not have a car. The media guidance application may further determine that the two hours will occur between 5:00 pm and 7:00 pm because the user is busy until 5:00 pm, and the barber shop closes at 7:00 pm. The manner in which the media guidance application computes the estimated range of time is discussed in great length above, and the contents of that discussion are within the scope of process 700.

It should be noted that processes 600-700 or any step thereof could be performed on, or provided by, any of the devices shown in FIGS. 1 and 4-5. For example, any of processes 600-700 may be executed by control circuitry 404 (FIG. 4) as instructed by control circuitry implemented on user equipment 502, 504, and/or 506 (FIG. 5) in order to ensure media borrowed by a user is returned to its rightful owner. In addition, one or more steps of processes 600-700 may be incorporated into or combined with one or more steps of any other process or embodiment.

It is contemplated that the steps or descriptions of each of FIGS. 6-7 may be used with any other embodiment of this disclosure. In addition, the steps and descriptions described in relation to FIGS. 6-7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present invention may be executed using processing circuitry. For instance, determining a characteristic of a user may be performed, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, a user profile, as described herein, may be stored in, and retrieved from, storage 408 of FIG. 4, or media guidance data source 518 of FIG. 5. Furthermore, processing circuitry, or a computer program, may update settings associated with a user, such as traits of a user by updating the information stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for resolving a meaning of an ambiguous calendar entry and recommending non-transitory media based on the meaning, the method comprising:
   detecting a calendar entry specific to a user;
   determining that the calendar entry is ambiguous with respect to an associated period of time;
   in response to determining that the calendar entry is ambiguous with respect to the associated period of time:
      identifying a task of the calendar entry by analyzing a keyword from the calendar entry,
      determining a trait of the user that correlates with the identified task, wherein the trait is at least one of an age and an ability of the user,
   accessing a database,
   accessing an entry of the database corresponding to the identified task,
   comparing the determined trait to metadata of the entry of the database to find metadata matching the determined trait, and
   in response to finding metadata matching the determined trait, computing an estimated range of time corresponding to the calendar entry based on the metadata matching the determined trait of the user; and
   generating for display a recommendation of media based on the estimated range of time.

2. The method of claim 1, further comprising:
   receiving, from the user, a request to view media asset identifiers corresponding to a desired time period; and
   in response to receiving the request, accessing a database comprising a personal calendar of the user, wherein the personal calendar comprises the calendar entry.

3. The method of claim 2, wherein detecting the calendar entry comprises:
   querying the personal calendar for an entry corresponding to the desired time period; and
   retrieving, based on the query, the calendar entry from the personal calendar, wherein the calendar entry partially corresponds to the desired time period.

4. The method of claim 3, wherein determining that the calendar entry is ambiguous with respect to the associated period of time comprises:
   determining that the calendar entry is the task that is to be performed by the user within the desired time period, but that the calendar entry is not specific with respect to at least one of (1) how much time of the desired time period the task will require, or (2) what portion of the desired time period the task will take place.

5. The method of claim 1, wherein generating for display the recommendation of broadcast media comprises generating for display a justification of the estimated range of time, and wherein the method further comprises:
   generating for display a selectable option for the user to adjust the estimated range of time;
   receiving user input to adjust the estimated range of time; and in response to receiving the user input, generating for display a modified recommendation of broadcast media.

6. The method of claim 1, wherein generating for display the recommendation of broadcast media comprises generating for display media asset identifiers corresponding to media that will not be broadcast during the estimated range of time.

7. The method of claim 6, wherein the method further comprises:
   receiving proof from the user that the user has completed the task called for by the calendar entry prior to an expiration of the range of time; and
   in response to receiving the proof, modifying the recommendation to include media asset identifiers for media that will be broadcast during the estimated range of time.

8. The method of claim 1 wherein the trait of the user further comprises at least one of the mode of transportation commonly used by the user, the status of traffic conditions between the user's location and a destination called for by the calendar entry, prior historical data of time utilized by the user or similar users to complete the task called for by the calendar entry, a status of the health of the user, tools in the possession of the user, the status of another user commonly relied upon by the user to perform the task called for by the calendar entry, the estimated time to complete the task called for in a calendar entry other than the calendar entry, a proximity in time of a separate calendar entry to the calendar entry.

9. A system for resolving a meaning of an ambiguous calendar entry and recommending broadcast media based on the meaning, the system comprising:
   control circuitry configured to:
      detect a calendar entry specific to a user;
      determine that the calendar entry is ambiguous with respect to an associated period of time;
      in response to determining that the calendar entry is ambiguous with respect to the associated period of time:

identify a task of the calendar entry by analyzing a keyword from the calendar entry, determine a trait of the user that correlates with the identified task, wherein the trait is at least one of an age and an ability of the user, access a database, access an entry of the database corresponding to the identified task, compare the determined trait to metadata of the entry of the database to find metadata matching the determined trait, and in response to finding metadata matching the determined trait, compute an estimated range of time corresponding to the calendar entry based on the metadata matching the determined trait of the user; and generate for display a recommendation of broadcast media based on the estimated range of time.

10. The system of claim 9 wherein the trait of the user further comprises prior historical data of time utilized by the user or similar users to complete the task of the calendar entry.

11. The system of claim 9, wherein the control circuitry is further configured to:

receive, from the user, a request to view media asset identifiers corresponding to a desired time period; and in response to receiving the request, access a database comprising a personal calendar of the user, wherein the personal calendar comprises the calendar entry.

12. The system of claim 11, wherein the control circuitry is further configured, when detecting the calendar entry, to:

query the personal calendar for an entry corresponding to the desired time period; and retrieve, based on the query, the calendar entry from the personal calendar, wherein the calendar entry partially corresponds to the desired time period.

13. The system of claim 12, wherein the control circuitry is further configured, when determining that the calendar entry is ambiguous with respect to the associated period of time, to:

determine that the calendar entry is the task that is to be performed by the user within the desired time period, but that the calendar entry is not specific with respect to at least one of (1) how much time of the desired time period the task will require, or (2) what portion of the desired time period the task will take place.

14. The system of claim 9, wherein the control circuitry is further configured, when generating for display the recommendation of broadcast media, to generate for display a justification of the estimated range of time, and wherein the control circuitry is further configured to:

generate for display a selectable option for the user to adjust the estimated range of time;

receive user input to adjust the estimated range of time; and in response to receiving the user input, generate for display a modified recommendation of broadcast media.

15. The system of claim 9, wherein the control circuitry is further configured, when generating for display the recommendation of broadcast media, to generate for display media asset identifiers corresponding to media that will not be broadcast during the estimated range of time.

16. The system of claim 15, wherein the control circuitry is further configured to:

receive proof from the user that the user has completed the task called for by the calendar entry prior to an expiration of the range of time; and in response to receiving the proof, modify the recommendation to include media asset identifiers for media that will be broadcast during the estimated range of time.

17. The system of claim 9 wherein the trait of the user further comprises comprises at least one of the mode of transportation commonly used by the user, the status of traffic conditions between the user's location and a destination called for by the calendar entry, prior historical data of time utilized by the user or similar users to complete the task called for by the calendar entry, a status of the health of the user, tools in the possession of the user, the status of another user commonly relied upon by the user to perform the task called for by the calendar entry, the estimated time to complete the task called for in a calendar entry other than the calendar entry, a proximity in time of a separate calendar entry to the calendar entry.

* * * * *